(12) United States Patent
Mori et al.

(10) Patent No.: US 11,953,045 B2
(45) Date of Patent: Apr. 9, 2024

(54) SCREW THREAD

(71) Applicant: TOPURA CO., LTD., Hadano (JP)

(72) Inventors: Shigeto Mori, Hadano (JP); Mayumi Matsuno, Hadano (JP); Naoki Horiuchi, Hadano (JP)

(73) Assignee: TOPURA CO., LTD., Hadano (JP)

( * ) Notice: Subject to any disclaimer, the term of this patent is extended or adjusted under 35 U.S.C. 154(b) by 348 days.

(21) Appl. No.: 17/430,625

(22) PCT Filed: Feb. 3, 2020

(86) PCT No.: PCT/JP2020/003975
§ 371 (c)(1),
(2) Date: Aug. 12, 2021

(87) PCT Pub. No.: WO2020/166415
PCT Pub. Date: Aug. 20, 2020

(65) Prior Publication Data
US 2022/0128082 A1    Apr. 28, 2022

(30) Foreign Application Priority Data

Feb. 13, 2019 (JP) ................................ 2019-023474

(51) Int. Cl.
*F16B 33/02* (2006.01)
(52) U.S. Cl.
CPC ..................... *F16B 33/02* (2013.01)
(58) Field of Classification Search
CPC ........ F16B 33/02; F16B 39/30; F16B 35/007; F16B 25/0047; F16B 25/0052; F16B 2200/93

USPC .................................. 411/308–311, 417–418
See application file for complete search history.

(56) References Cited

U.S. PATENT DOCUMENTS

| | | | | |
|---|---|---|---|---|
| 3,742,541 A * | 7/1973 | Ohmoto | .................... | B23G 5/06 408/217 |
| 3,789,644 A | 2/1974 | Orlomoski | | |
| 6,863,483 B2 | 3/2005 | Koenig et al. | | |
| 7,101,134 B2 * | 9/2006 | LeVey | ...................... | B21H 3/02 411/416 |

(Continued)

FOREIGN PATENT DOCUMENTS

| | | |
|---|---|---|
| DE | 9103773 U1 | 7/1992 |
| JP | 3389331 B2 | 3/2003 |

(Continued)

OTHER PUBLICATIONS

Extended European Search Report dated Oct. 4, 2022 (corresponding to EP 20755917.0).

*Primary Examiner* — Flemming Saether
(74) *Attorney, Agent, or Firm* — Harness, Dickey & Pierce, P.L.C.

(57) ABSTRACT

To provide a screw thread which achieves a further reduction in screwing torque while securing removability of a coating film or the like and which is capable of stabilizing conductivity. In a screw thread in which a recessed portion (7) is partially provided on a flank surface (131) of a screw thread ridge provided on a screw thread shaft main body (5), a screw thread ridge (13) in a section where the recessed portion (7) is formed is smaller than a regular screw thread ridge (3), and a ridge height (H12) in a distal end portion in a screwing direction is lower than a ridge height (H11) in a rear end portion in the screwing direction W.

9 Claims, 5 Drawing Sheets

(56) References Cited

U.S. PATENT DOCUMENTS

| | | | | |
|---|---|---|---|---|
| 8,864,430 | B2* | 10/2014 | Su | F16B 25/106 |
| | | | | 411/386 |
| 9,404,524 | B2* | 8/2016 | Pritchard | F16B 33/02 |
| 9,903,405 | B2* | 2/2018 | Fujimoto | F16B 25/0052 |
| 2016/0138639 | A1 | 5/2016 | Fujimoto et al. | |
| 2021/0231157 | A1* | 7/2021 | Sugiyama | F16B 25/0047 |

FOREIGN PATENT DOCUMENTS

| | | |
|---|---|---|
| JP | 2005-127487 A | 5/2005 |
| JP | 2013-096466 A | 5/2013 |
| KR | 20090017318 A | 2/2009 |
| WO | 2015/049761 A1 | 4/2015 |
| WO | 2015/098823 A1 | 7/2015 |

\* cited by examiner

SCREW THREAD

CROSS-REFERENCE TO RELATED APPLICATIONS

This application is a National Stage of International Application No. PCT/JP2020/003975, filed Feb. 3, 2020 (now WO 2020/166415A1), which claims priority to Japanese Application No. 2019-023474 filed on Feb. 13, 2019. The entire disclosures of each of the above applications are incorporated herein by reference.

FIELD

The present disclosure relates to a screw thread imparted with a coating film-removing function to provide conductivity with a coated nut when fastening the screw thread to the nut.

BACKGROUND

Conventionally, as a normal process involving fastening using a combination of a screw thread and a weld nut (hereinafter, referred to as a nut) on a car assembly line, the nut is attached to a body or the like by welding and, after applying a coating, the respective parts are fastened by the screw thread.

When imparting conductivity between the screw thread and the nut in order to, for example obtain grounding using the screw thread, a coating having entered the nut must be removed by re-tapping or masking must be performed in order to prevent the coating from entering the nut during application.

Presently, for the purpose of omitting such wasteful processes and improving workability, screw threads are being used which impart conductivity when tightened in a state where a coating is present inside a nut.

As such a screw thread that imparts conductivity, the present applicants have already proposed the screw thread disclosed in Patent Literature 1.

The screw thread is provided with a first recessed portion on a pressure-side flank surface of a screw thread ridge provided on a screw thread shaft main body, wherein a coating film on an internal screw thread side can be removed by an edge portion of the first recessed portion, a removed coating is retained in the first recessed portion, and a pressure-side flank surface of the screw thread ridge other than the first recessed portion is brought into pressure contact with an original surface of the internal screw thread from which the coating film has been removed to enable conduction. Furthermore, an angle of a clearance-side flank surface of the screw thread ridge is made smaller than an angle of the pressure-side flank surface to form a gap for retaining the removed coating between the internal screw thread and the clearance-side flank surface.

CITATION LIST

Patent Literature

Patent Literature 1: Japanese Patent No. 3389331

SUMMARY

Technical Problem

With the screw thread according to Patent Literature 1, since a configuration is adopted in which a coating is removed using the edge portion of the first recessed portion while retaining the removed coating in the first recessed portion, screwing torque is reduced and a contribution is made toward improving workability of a screw tightening operation.

However, with recent increases in corrosion resistance required values of fastening members, coating film thickness has increased and a thickness of a coating film that adheres to an internal screw thread root bottom portion is around 100 µm. Even in such circumstances, higher coating film removability and stable conducting performance are required while securing same workability as was conventional.

In this context, while the screw thread according to PTL 1 is configured such that electricity is conducted due to the pressure-side flank surface of a screw thread ridge provided on the screw thread shaft main body coming into close contact with the pressure-side flank surface of an internal screw thread of which a coating film has been removed to expose a metal surface, it is difficult to secure coating film removability, conductivity, and screwing workability with respect to coating of an internal screw thread with greater film thickness by simply providing a recessed portion and changing a ridge shape thereof.

An object of the present disclosure is to provide a screw thread with stable conducting performance which improves screwing workability while securing coating film removability even with respect to an internal screw thread portion covered with a thick film coating.

Solution to Problem

In order to achieve the object described above, the present disclosure provides a screw thread partially provided with a recessed portion on a flank surface of a screw thread ridge provided on a screw thread shaft main body, wherein a screw thread ridge in a section where the recessed portion is formed is smaller than a regular screw thread ridge and a ridge height in a distal end portion in a screwing direction is lower than a ridge height in a rear end portion in the screwing direction, the screw thread ridge in the section where the recessed portion is formed is provided with a stepped portion which overhangs sideways more than a flank surface of the regular screw thread ridge and which comes into contact with or approaches an inner diameter edge portion of an internal screw thread when fitting the internal screw thread, and the recessed portion is provided on opposing flank surfaces in a same phase of screw thread ridges that are adjacent to each other, a root width between stepped portions of screw thread ridges of the sections where the recessed portion is formed which are adjacent to each other is narrower than a root width of the regular screw thread ridges, and a root width between the stepped portions in the distal end portion in the screwing direction is narrower than a root width between the stepped portions in the rear end portion in the screwing direction.

In this manner, by varying, in a lead direction, the ridge height of the recessed portion being partially provided on the flank surface of the screw thread ridge, an increase in screwing torque can be suppressed while securing a larger volume for retaining removed coating film.

In addition, providing the stepped portion enables rotational wobble of an external screw thread shaft during tightening to be suppressed, prevents a crest portion of a screw thread ridge from penetrating into coating film thickness in a vicinity of a root bottom of an internal screw thread at which film thickness is greatest due to the crest portion of the screw thread ridge being screwed in a biased state upon penetration into the internal screw thread, and also achieves a reduction in screwing torque.

Furthermore, due to removed coating film being compressed and pushed into a root bottom portion with a narrowest width in accordance with rotation during screwing, an excess portion of the removed coating film can be prevented from moving to a screw thread ridge flank surface to be a conductive portion and, by preventing the excess portion of the removed coating film from being interposed between flank conductive surfaces of the external screw thread and the internal screw thread of the conducting portion, conducting performance can be stabilized.

The diameter of the stepped portion can be set to 85% to 110% of an inner diameter of the inner diameter end portion of the internal screw thread.

Setting the diameter of the stepped portion slightly larger than the inner diameter of the inner diameter end portion of the internal screw thread causes the stepped portion and the inner diameter end portion of the internal screw thread to come into contact with each other, whereby conductivity can be increased by the contact portion.

In addition, a configuration can be adopted in which a height of the stepped portion varies regularly or irregularly in a circumferential direction and the stepped portion comes into contact with the internal screw thread inner diameter end portion at some point within one pitch (one rotation on a circumference).

Furthermore, a configuration can be adopted in which a flank surface bulging ridge-shaped portion including a bulging portion that overhangs with respect to a flank surface of a regular screw thread ridge is provided in a section of the regular screw thread ridge which is adjacent to the recessed portion.

Locally providing the flank surface bulging ridge-shape enables a removing function by a protruding shape portion of the bulging portion to be exhibited in addition to the recessed portion with respect to a ridge shape of a regular ordinary screw thread ridge and, furthermore, enables removing performance of a thick coating film to be improved.

At the same time, because the bulging portion of the flank surface bulging ridge-shape protrudes farther toward a side of the pressure-side flank surface of an internal screw thread than the flank surface of a regular screw thread ridge, even when an axial force during fastening is low, contact surface pressure between flank surfaces of the external screw thread and the internal screw thread locally increases and an electric resistance value of a contact conducting portion drops in a stable manner.

In addition, by providing at least two or more sets of three types of screw thread ridge shapes including the ridge shape of a regular screw thread ridge, the ridge shape of a section provided with the recessed portion, and the flank surface bulging ridge-shape within one lead, a stably superior conducting performance can be exhibited while securing coating film removability and suppressing screwing torque even with respect to an internal screw thread with a thick film coating.

Advantageous Effects of the Disclosure

According to the present disclosure, a screw thread can be provided which achieves a further reduction in screwing torque while securing removability of a coating film even with respect to an internal screw thread covered with a thick film coating and which is capable of stably exhibiting superior conducting performance even when an axial force is low.

DRAWINGS

Figure 3A:
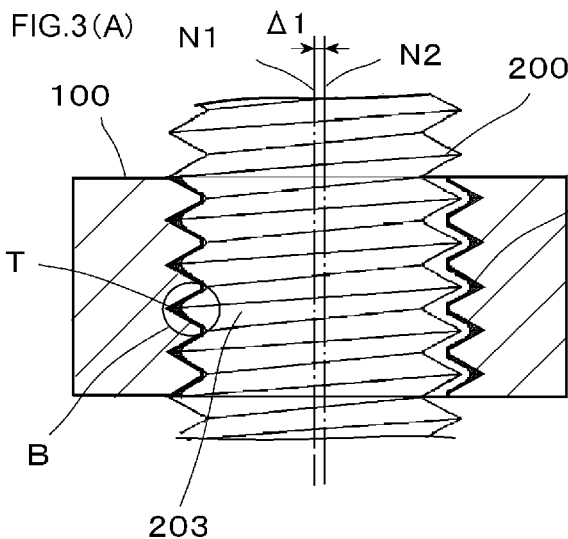
Figure 3B:
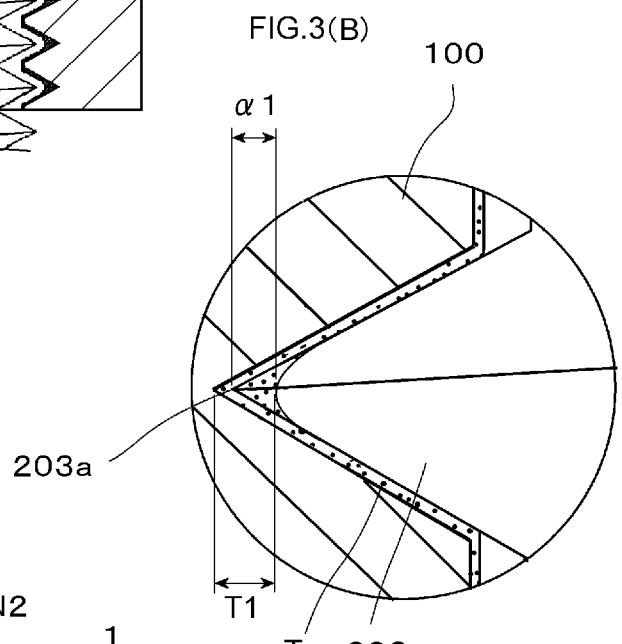
Figure 3C:
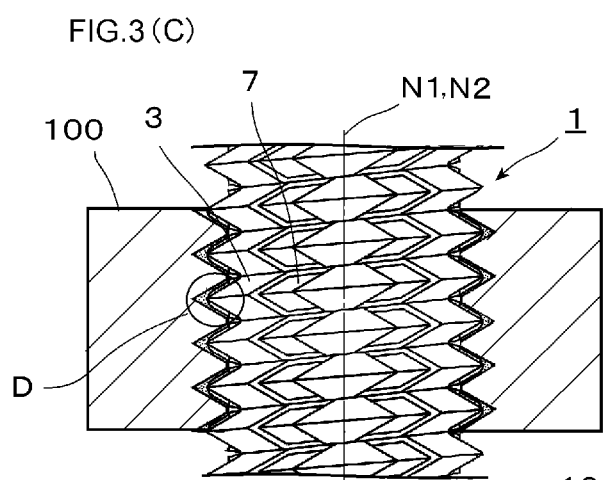
Figure 3D:
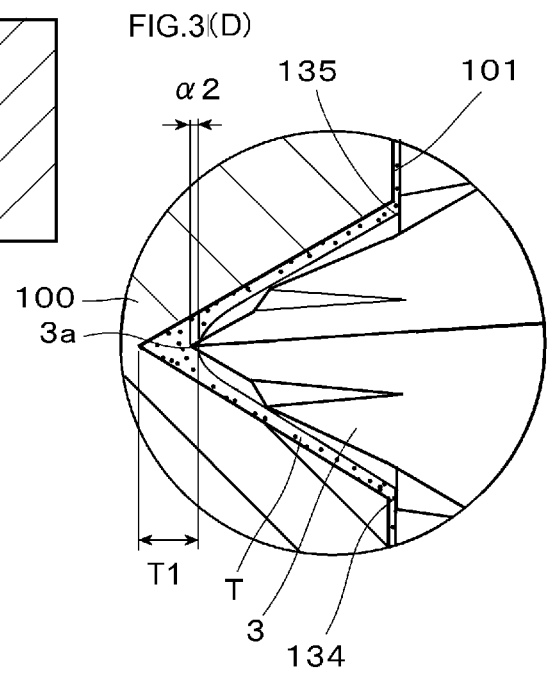

FIG. 3(A) is a sectional view of a state where a conventional screw thread has been screwed into an internal screw thread member, FIG. 3(B) is an enlarged view of portion B in FIG. 3(A), FIG. 3(C) is a sectional view of a state where the screw thread according to the present disclosure has been screwed into an internal screw thread member, and FIG. 3(D) is an enlarged view of portion D in FIG. 3(C).

Figure 4:
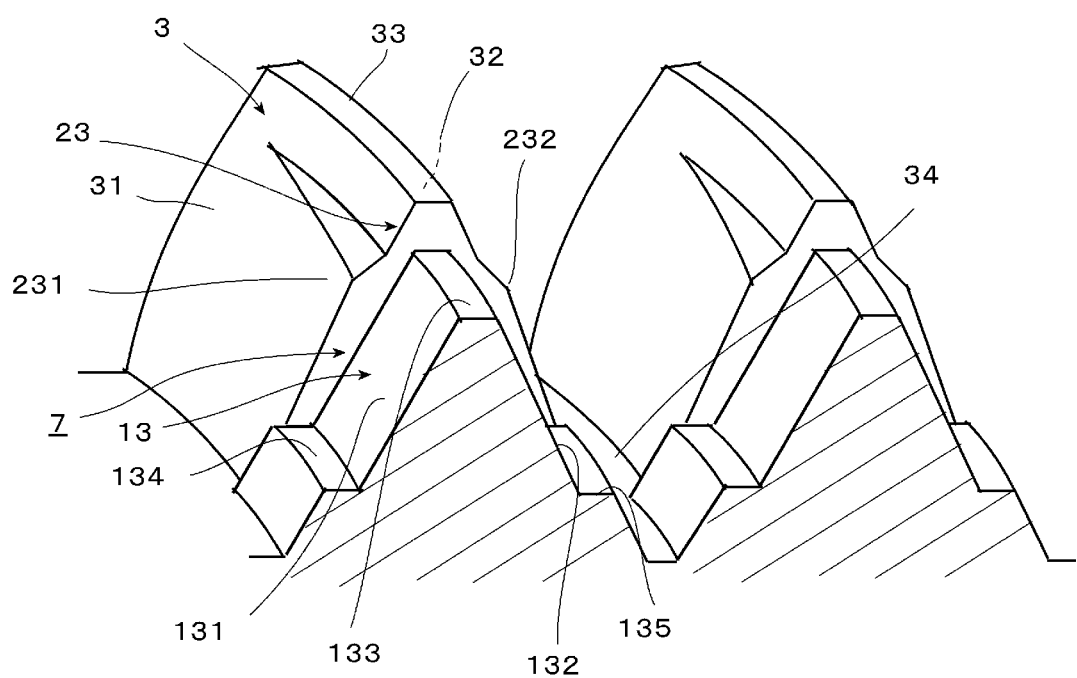

FIG. 4 is a partial sectional perspective view of the screw thread shown in FIG. 1.

FIG. 5 shows a screw thread according to another embodiment of the present disclosure.

DETAILED DESCRIPTION

Hereinafter, the present disclosure will be described based on illustrated embodiments.

Figure 1A:
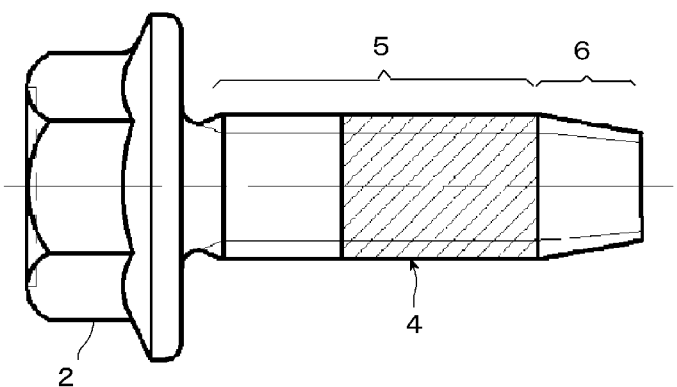
FIG. 1(A) is a conceptual diagram showing an overall configuration of a screw thread according to an embodiment of the present disclosure.

First, an overall configuration of a screw thread according to an embodiment of the present disclosure will be described with reference to FIGS. 1(A) and 1(B). FIG. 1(A) is a conceptual diagram showing an overall configuration of the screw thread and FIG. 1(B) is a diagram showing a more specific configuration thereof.

In the diagrams, a screw thread 1 is made up of a head portion 2 and a screw thread shaft portion 4 provided with a screw thread ridge 3. The screw thread shaft portion 4 is made up of a screw thread shaft main body 5 and a distal end tapered portion 6 that extends from a distal end of the screw thread shaft main body, and the screw thread ridge 3 is continuously formed from the screw thread shaft main body 5 to the distal end tapered portion 6.

Figure 1B:
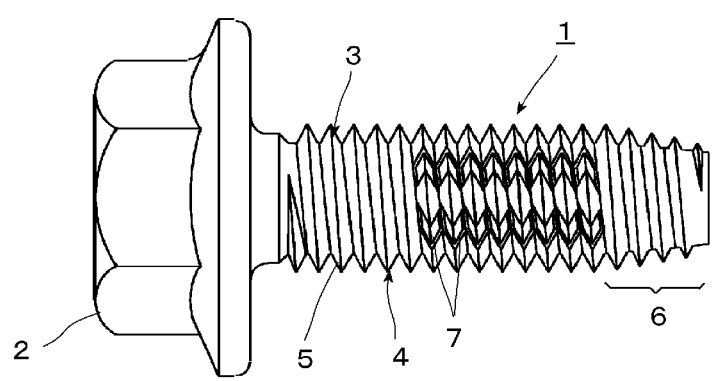
FIG. 1(B) is a diagram showing a more specific configuration of FIG. 1(A)

As shown in FIG. 1(B), recessed portions 7 are regularly arranged at predetermined intervals at a plurality of locations (six locations in the present example) in a circumferential direction for each turn on the screw thread ridge 3 of the screw thread shaft main body 5 and, in the illustrated example, the recessed portions 7 are consecutively formed for about eight turns from a boundary portion with the distal end tapered portion 6 toward a side of the head portion 2. In addition, the recessed portion 7 of each screw thread ridge 3 among the eight turns is provided in a same phase in the circumferential direction.

Figure 1C:
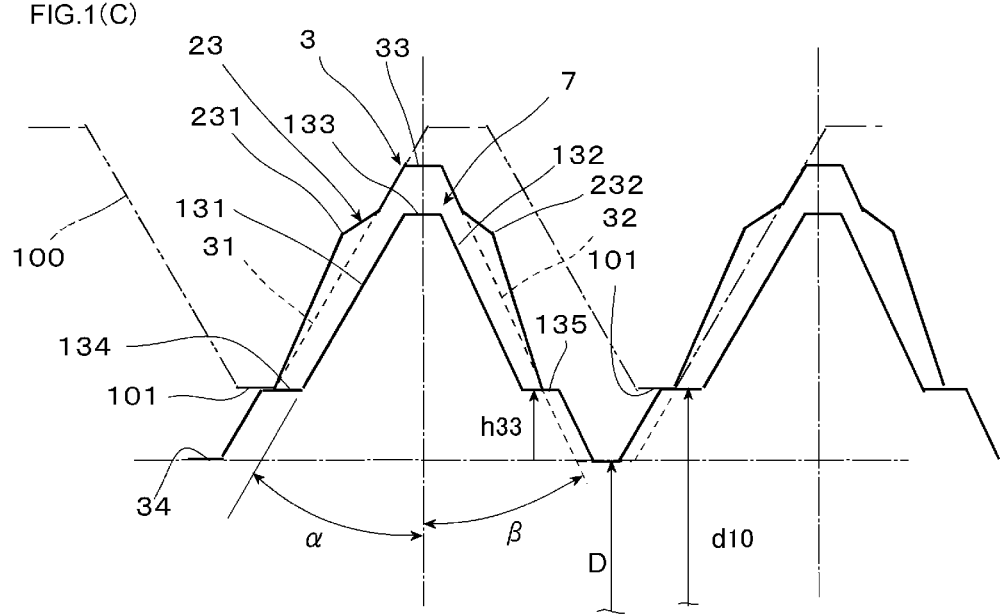
FIG. 1(C) is a partial enlarged sectional view of a recessed portion cut along a plane that passes through a central axial line of a screw thread shaft in FIG. 1(B).
Figure 2A:
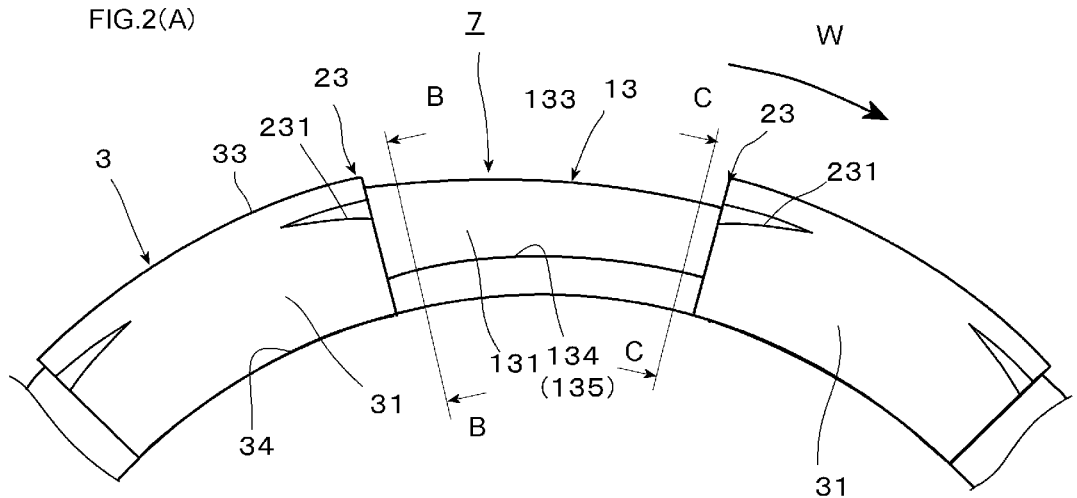
FIG. 2(A) is a diagram of a vicinity of the recessed portion shown in FIG. 1 as viewed in a central axis direction.
Figure 2B:
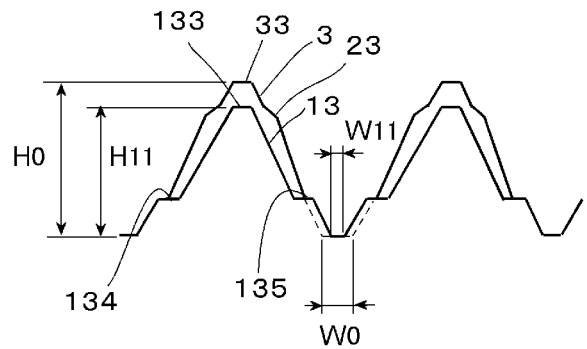
FIG. 2(B) is a sectional view taken along line B-B in FIG. 2(A)
Figure 2C:
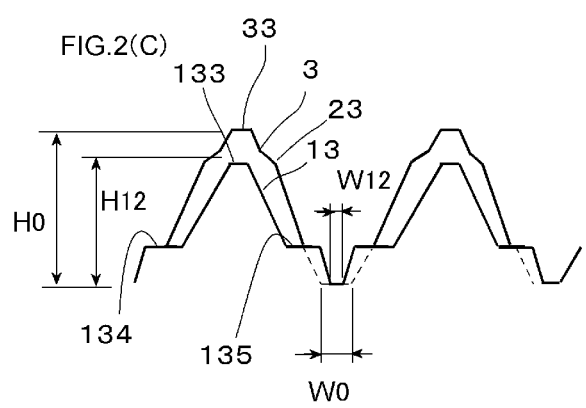
FIG. 2(C) is a sectional view taken along line C-C in FIG. 2(A).

Next, a configuration of the recessed portion that is a feature of the present disclosure will be described with reference to FIGS. 1(C) and 2. FIG. 1(C) is a partial enlarged sectional view of the recessed portion 7 cut along a plane that passes through a central axial line N of a screw thread shaft, FIG. 2(A) is a diagram of a vicinity of the recessed portion shown in FIG. 1 as viewed in a central axis direction, FIG. 2(B) is a sectional view taken along line B-B in FIG. 2(A), and FIG. 2(C) is a sectional view taken along line C-C in FIG. 2(A).

When a screw thread ridge in a section where the recessed portion 7 is formed is assumed to be a recessed portion screw thread ridge 13, the recessed portion screw thread ridge 13 is configured such that a ridge height thereof is lower than that of a regular screw thread ridge 3 and both a pressure-side flank surface 31 and a clearance-side flank surface 32 are depressed by predetermined dimensions. A screw thread ridge angle β of the clearance-side flank surface 32 of the regular screw thread ridge 3 is smaller than a screw thread ridge angle α of the pressure-side flank surface, and a gap between the clearance-side flank surfaces of an internal screw thread 100 is formed larger than a regular screw thread ridge to lower a contact pressure with a thick coating film adhered to a screw thread ridge on the internal screw thread side. In the example, the angle of the pressure-side flank surface 31 is set to 30 degrees and the angle of the clearance-side flank surface 32 is set to 25 degrees. It is needless to say that angles are not limited thereto and are appropriately selected according to load conditions and the like.

A pressure-side flank surface 131 and a clearance-side flank surface 132 of the recessed portion screw thread ridge 13 have similar flank angles to the pressure-side flank surface 31 and the clearance-side flank surface 32 of the regular screw thread ridge 3 and a removed coating is retained in a space of this section.

Root portion sides of the pressure-side flank surface 131 and the clearance-side flank surface 132 of the recessed portion screw thread ridge 13 are provided with stepped portions 134 and 135 which overhang sideways (a central axial direction of the screw thread shaft) more than the pressure-side flank surface 31 and the clearance-side flank surface 32 of the regular screw thread ridge 3 and which minimize clearances with an inner diameter end portion 101 of the internal screw thread 100 during fitting of the internal screw thread, and have stepped shapes. Positions of the stepped portions 134 and 135 are at a predetermined height h33 from a root portion 34.

In addition, a diameter d10 of the stepped portions 134 and 135 of the recessed portion screw thread ridge 13 is set larger than a root diameter D of the regular screw thread ridge 3 and either slightly larger than an inner diameter of the inner diameter end portion 101 of the internal screw thread or equal to or smaller than the inner diameter of the inner diameter end portion 101 of the internal screw thread. Specifically, the diameter d10 of the stepped portions 134 and 135 is set to 85% to 110% of an inner diameter of the inner diameter end portion 101 of the internal screw thread 100.

By adopting such a setting, when the external screw thread is screwed into the internal screw thread, an amount of decentering of the external screw thread rotary shaft with respect to a screw thread ridge axial center of the screw thread is kept small, a crest portion of an external screw thread ridge does not strongly penetrate into the thick coating film portion being adhered to the internal screw thread root bottom portion, and an increase in screwing torque is suppressed.

FIGS. 3(A) and 3(B) show screwing states of a conventional screw thread 200 and the internal screw thread 100, and FIGS. 3(C) and 3(D) show screwing states of the screw thread 1 according to the present disclosure and the internal screw thread 100. In FIG. 3, a screw thread ridge is described as a triangular screw thread with a pointed crest portion. A coating film T adhered to an inner circumference of the internal screw thread 100 constitutes a thick coating film portion T1 with a large thickness in a root bottom portion.

In the case of the conventional screw thread 200, an amount of decentering Δ1 relative to the internal screw thread 100 (refer to FIG. 3(A)) is large, a crest portion 203a of a screw thread ridge 203 is screwed in a biased state when entering the internal screw thread 100 due to a rotational wobble of the screw thread shaft during tightening and penetrates into the thick coating film portion T1 in a vicinity of a root bottom (an amount of penetration α1 in FIG. 3(B)), and screwing torque increases. In particular, in a case of a cationic coating, there is a problem in that the thick coating film portion T having been compacted due to forcible penetration during screwing becomes extremely hard and an increase in torque causes workability to decline.

By comparison, in the present disclosure, the stepped portions 134 and 135 of the recessed portion screw thread ridge 13 come into contact with the inner diameter end portion 101 of the internal screw thread 100 and decentering is kept to a very small amount. Therefore, rotational wobble of the screw thread shaft during tightening is minimal, an amount of penetration α2 of a crest portion 3a of the screw thread ridge 3 with respect to the thick coating film portion T1 is small, and an increase in screwing torque can be suppressed. In other words, the thick coating film portion T1 is a section that need not be removed, and compared to excess torque being generated in the past, only a necessary section between flank surfaces can be reliably removed according to the present disclosure.

In addition, due to the stepped portions 134 and 135 of the recessed portion screw thread ridge 13 and the internal screw thread inner diameter end portion 101 coming into contact with each other, a contact portion area increases and also contributes toward improving conductivity.

While a cross-sectional shape of upper surfaces of the stepped portions 134 and 135 on a plane that passes through a central axis N of the screw thread shaft is described as a straight line perpendicular to a central line of the recessed portion screw thread ridge 13 (a line connecting crests of sharp ridges of the recessed portion screw thread ridge 13 that is perpendicular to the central axis N), the straight line need not be perpendicular to the central line of the recessed portion screw thread ridge 13 and may be inclined in a direction in which height decreases or increases toward a root bottom portion or the cross-sectional shape have a curved shape such as an arc instead of a straight line. Furthermore, while a height of the upper surfaces of the stepped portions 134 and 135 from the root portion 34 is constant in a circumferential direction, the height may vary regularly or irregularly and a configuration need only be adopted in which the upper surfaces of the stepped portions 134 and 135 interfere with the inner diameter end portion of the internal screw thread 100 within one pitch (one rotation on the circumference). It should be noted that diameters of the stepped portions 134 and 135 are dimensions at root positions of the pressure-side flank surface 31 and the clearance-side flank surface 32 of the stepped portions 134 and 135 which are restrained by a mold.

(Screw Thread Ridge Height of Recessed Portion Screw Thread Ridge)

Next, a screw thread ridge height of the recessed portion screw thread ridge 13 will be described with reference to FIG. 2.

As shown in FIG. 2(A), a crest portion 133 of the recessed portion screw thread ridge 13 becomes one step lower than a crest portion 33 of the regular screw thread ridge 3 at a rear end portion along a screwing direction W, and a diameter decreases so that the ridge height becomes gradually lower toward a distal end portion in the screwing direction and reaches a minimum diameter at a distal end position in the screwing direction. In other words, as shown in FIGS. 2(B) and 2(C), a ridge height H12d in the distal end portion in the screwing direction W of the recessed portion screw thread ridge 13 is lower than a ridge height H11 in the rear end portion in the screwing direction. A ridge height refers to a height dimension from a root portion to a crest portion along a direction perpendicular to the central axial line N of a screw thread shaft.

Adopting such a configuration enables a gap for retaining foreign objects such as removed coating film to be secured over a larger region as compared to a case where the ridge height of the recessed portion screw thread ridge 13 is constant, and screwing torque can be reduced while improving coating film removal performance.

Furthermore, an outer diameter difference from the recessed portion 7 to the regular screw thread ridge 3 can be reduced and an increase in screwing torque due to a sudden fluctuation in the ridge height can also be suppressed.

When the ridge height of the crest portion 33 of the regular screw thread ridge 3 is denoted by HO, a ridge height H12 in the distal end portion is preferably set to around 60% to 98% of the ridge height HO of the regular screw thread ridge 3. In addition, the ridge height H11 in the rear end portion is preferably set to around 65% to less than 100% of the ridge height HO of the regular screw thread ridge 3.

(Root Width of Recessed Portion Screw Thread Ridge)

Next, a root width between recessed portion screw thread ridges 13 will be described with reference to FIGS. 2(B) and 2(C).

The recessed portion screw thread ridges 13 provided on adjacent regular screw thread ridges 3 are in a same phase as viewed in a circumferential direction of the screw thread shaft portion, and a root width W11 or W12 between the stepped portions 134 and 135 of the recessed portion screw thread ridges 13 is narrower than a root width WO of the regular screw thread ridges 3 over an entire length in the circumferential direction. In addition, the root width W12 in the distal end portion in the screwing direction is narrower than the root width W11 between the stepped portions 134 and 135 in the rear end portion in the screwing direction. The root width is widest in the rear end portion in the screwing direction, gradually decreases toward the distal end, and is narrowest in the distal end portion in the screwing direction.

Accordingly, the ridge height of the recessed portion screw thread ridge 13 increases in the rear end portion in the screwing direction and sections where a retention space of a coating film or the like contracts in the crest portion 133 or on the flank surfaces 131 and 132 can be compensated for by a section with an increased root width in the root bottom portion.

Furthermore, a coating film removed by the rear end portion of the recessed portion 7 is supplied in the screwing direction to a root portion formed by the stepped portions 134 and 135 while an amount of the coating film increases, and the coating film is further pushed toward the root bottom portion with the root width W12 in the distal end portion in the screwing direction where the root width narrows. Moreover, due to the removed coating film being compressed by the inner diameter end portion 101 of the internal screw thread 100 and being enclosed between the inner diameter end portion 101 and the stepped portion 134, transfer of an excess portion of the removed coating film to the pressure-side flank surface 31 of the regular screw thread ridge 3 to become a conducting portion is suppressed. As described above, by preventing removed coating film from being interposed in a contact portion to become a conducting surface of flank surfaces between the external screw thread and the internal screw thread in a conducting portion, the contact portion becomes metal-to-metal contact and conducting performance can be stabilized.

(Flank Surface Bulging Ridge-Shape)

Next, the flank surface bulging ridge-shape 23 that is present in a section to become a boundary between the regular screw thread ridge 3 and the recessed portion 7 will be described with reference to FIGS. 1(C), 2, and 4.

The flank surface bulging ridge-shape 23 is present in each of the sections to become boundaries between the regular screw thread ridge 3 and the recessed portion 7 in the distal end portion and the rear end portion in the screwing direction W and, in both sections, ridge shapes are formed which have bulging portions 231 and 232 that bulge slightly more than the respective flank surfaces 31 and 32 of the pressure side and the clearance side with respect to the regular screw thread ridge portion 3.

The bulging portions 231 and 232 are present from a section with $\frac{1}{2}$ to $\frac{1}{3}$ of the ridge height of an ordinary screw thread ridge 3 and present within a range corresponding to a contact line of flank surfaces between the ordinary screw thread ridge 3 and an internal screw thread ridge. While being exaggerated in the drawings, since the bulges are small, a bulging height of the bulging portions 231 and 232 (a height in a perpendicular direction with respect to the flank surfaces 32) is within 0.1 mm. It is needless to say this range is not limited thereto and the range is appropriately selected according to screw thread size, load conditions, and the like.

The presence of the flank surface bulging ridge-shape 23 causes not only a recess shape of the recessed portion 7 with respect to a ridge shape of the ordinary screw thread ridge 3 but also a protruding shape portion of the bulging portions 231 and 232 to be arranged in the circumferential direction and further improves removal performance of a thick coating film. In addition, due to the bulging portions 231 and 232 protruding more than the flank surfaces 31 and 32 of the ordinary screw thread ridge 3, the bulging portions 231 and 232 come into localized contact with the pressure-side flank surface of the internal screw thread and realizes contact while generating high contact pressure even in a state where an axial force during fastening is low, and the external screw thread and the internal screw thread reliably come into metal contact with each other and an electric resistance value of a contact conducting portion drops in a stable manner.

Next, an operation of the embodiment presented above will be described.

The screw thread 1 is screwed into, for example, the internal screw thread 100 that is a weld nut or the like to which a coating has been applied. In addition, as shown in FIG. 1(C), a foreign object such as a coating film on an inner circumference of the internal screw thread 100 is removed on a boundary surface of a rear end portion in the screwing direction of the recessed portion 7 and a ridge shape of the ordinary screw thread ridge 3, and separation powder having been removed is retained in a root portion between the recessed portion 7 and the stepped portions 134 and 135. In the present disclosure, since a ridge height on a rear end portion side in the screwing direction of the recessed portion screw thread ridge 13 is high and a ridge height on a distal end side is low, an increase in screwing torque can be suppressed while securing a sufficient gap for retaining a foreign object such as a removed coating film.

Furthermore, while the crest portion 33 of the ordinary screw thread ridge 3 has a certain amount of clearance, since the clearance becomes extremely small as the stepped portion root bottoms 134 and 135 provided in the recessed portion 7 approach an internal screw thread inner diameter portion, an amount of decentering between an external screw thread shaft center and an axial center of an internal screw thread ridge inner diameter during screwing is suppressed, the crest portion 33 of the ordinary screw thread ridge 3 passes through a nut without being pushed into the internal screw thread root bottom portion where film thickness becomes largest, thereby suppressing screwing torque and improving workability.

In addition, when an axial force is generated, the bulging portions 231 and 232 of the flank surface bulging ridge-shape 23 that is present in a section to become a boundary between the regular screw thread ridge 3 and the recessed portion 7 antecedently come into localized contact with the pressure-side flank surface of the screw thread ridge of the internal screw thread 100, contact pressure increases with an increase in the axial force and becomes metal-to-metal contact, conduction starts, and as the regular screw thread ridge 3 and the pressure-side flank surface of the screw thread ridge of the internal screw thread 100 engage with and rub against each other, a metal contact surface increases and a final conducting portion is constructed.

According to the present disclosure, a screw thread can be provided which achieves a further reduction in screwing torque while securing removability of a coating film even with respect to an internal screw thread portion covered with a thick film coating and which is capable of stably exhibiting superior conducting performance even when an axial force is low.

As described above, according to the present embodiment, a further reduction in screwing torque is achieved while securing removability of a coating film even with respect to an internal screw thread portion covered with a thick film coating and superior conducting performance can be stably exhibited even when an axial force is low.

Figure 5A:
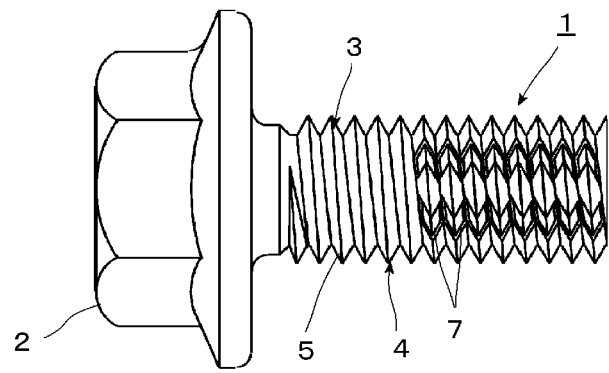
Figure 5B:
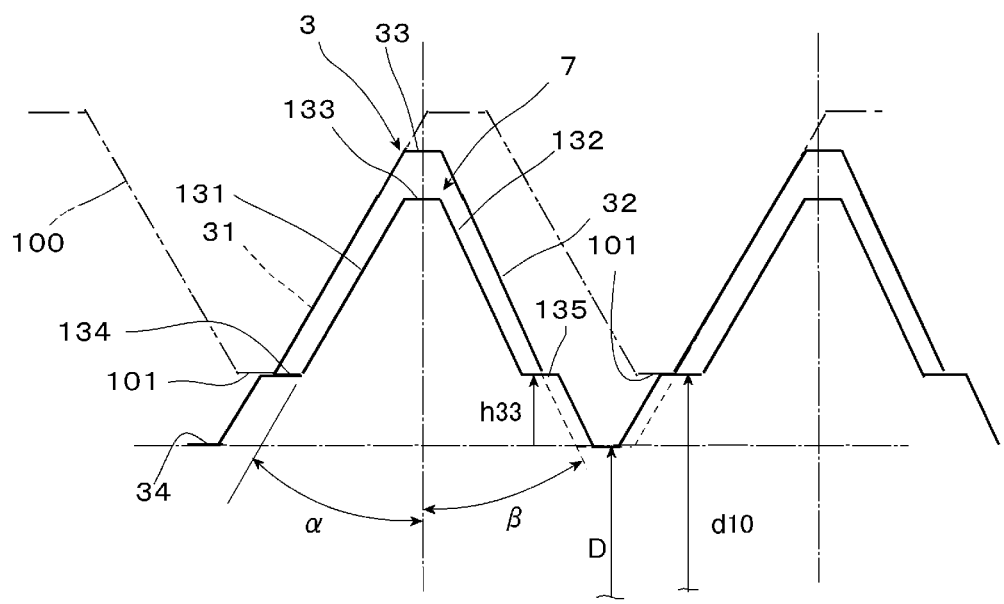

While a screw thread including a distal end tapered portion has been described in the embodiment presented above, as shown in FIG. 5(A), the distal end tapered portion need not be provided. In addition, while an example having the flank surface bulging ridge-shape 23 has been described in the embodiment presented above, as shown in FIG. 5(B), the flank surface bulging ridge-shape 23 need not be provided.

REFERENCE SIGNS LIST

1 Screw thread
2 Head portion
3 Screw thread ridge
31 Pressure-side flank surface
32 Clearance-side flank surface
33 Crest portion
34 Root portion
4 Screw thread shaft portion
5 Screw thread shaft main body
6 Distal end tapered portion
7 Recessed portion
8 Second recessed portion
13 Recessed portion screw thread ridge
131 Pressure-side flank surface
132 Clearance-side flank surface
133 Crest portion
134 Stepped portion
135 Stepped portion
100 internal screw thread
101 Inner diameter end portion
T Thick coating film portion

The invention claimed is:

1. A screw thread that is configured for insertion in an internal screw thread, comprising:
a recessed portion on a flank surface of a screw thread ridge provided on a screw thread shaft main body, wherein
the screw thread ridge in a section where the recessed portion is formed is smaller than a remainder of the screw thread ridge and a ridge height in a distal end portion in a screwing direction is lower than a ridge height in a rear end portion in the screwing direction,
the screw thread ridge in the section where the recessed portion is formed is provided with a stepped portion which overhangs sideways more than a flank surface of the remainder of the screw thread ridge and which is configured to come into contact with or approach an inner diameter edge portion of the internal screw thread when fitting the internal screw thread, and
the recessed portion is provided on opposing flank surfaces in a same phase of screw thread ridges that are adjacent to each other, a root width between stepped portions of screw thread ridges of the sections where the recessed portion is formed which are adjacent to each other is narrower than a root width of the remainder of the screw thread ridges, and a root width between the stepped portions in the distal end portion in the screwing direction is narrower than a root width between the stepped portions in the rear end portion in the screwing direction.

2. The screw thread according to claim 1, wherein a diameter of the stepped portion is set to 85% to 110% of an inner diameter of an inner diameter end portion of the internal screw thread.

3. The screw thread according to claim 2, wherein a height of the stepped portion varies regularly or irregularly in a circumferential direction and the stepped portion is configured to come into contact with the internal screw thread inner diameter end portion at some point within one pitch.

4. The screw thread according to claim 3, wherein a flank surface bulging ridge-shaped portion including a bulging portion that overhangs with respect to a flank surface of the remainder of the screw thread ridge is provided in a section of the remainder of the screw thread ridge which is adjacent to the recessed portion.

5. The screw thread according to claim 4, wherein two or more sets of the recessed portion, the flank surface bulging ridge-shaped portion, and an ordinary screw thread portion are present within one lead.

6. The screw thread according to claim 2, wherein a flank surface bulging ridge-shaped portion including a bulging portion that overhangs with respect to a flank surface of the remainder of the screw thread ridge is provided in a section of the remainder of the screw thread ridge which is adjacent to the recessed portion.

7. The screw thread according to claim 6, wherein two or more sets of the recessed portion, the flank surface bulging ridge-shaped portion, and an ordinary screw thread portion are present within one lead.

8. The screw thread according to claim 1, wherein a flank surface bulging ridge-shaped portion including a bulging portion that overhangs with respect to a flank surface of the regular screw thread ridge is provided in a section of the remainder of the screw thread ridge which is adjacent to the recessed portion.

9. The screw thread according to claim 8, wherein two or more sets of the recessed portions, the flank surface bulging ridge-shaped portion, and an ordinary screw thread portion are present within one lead.

* * * * *